N. O. LYNN.
WATER HEATER.
APPLICATION FILED NOV. 17, 1917.

1,328,161.

Patented Jan. 13, 1920.

N. O. Lynn
Inventor

By Geo. P. Kimmel
Attorney

UNITED STATES PATENT OFFICE.

NATHAN OREN LYNN, OF MENDON, MICHIGAN.

WATER-HEATER.

1,328,161. Specification of Letters Patent. Patented Jan. 13, 1920.

Application filed November 17, 1917. Serial No. 202,561.

*To all whom it may concern:*

Be it known that I, NATHAN OREN LYNN, a citizen of the United States, residing at Mendon, in the county of St. Joseph and State of Michigan, have invented certain new and useful Improvements in Water-Heaters, of which the following is a specification.

This invention relates to heating devices and it is the principal object of the invention to provide an improved water heater especially adapted for use by dentists whereby water or other solutions used for spraying the mouths of patients can be kept at a comfortable temperature.

Another and equally important object of the invention is to provide a novel form of cover for the wick of the heater, whereby the liquid fuel employed will be prevented from leaking over the same, thus rendering the heater safe and preventing an objectionable odor which might be caused should kerosene be used.

The improvements in the deatils and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1:
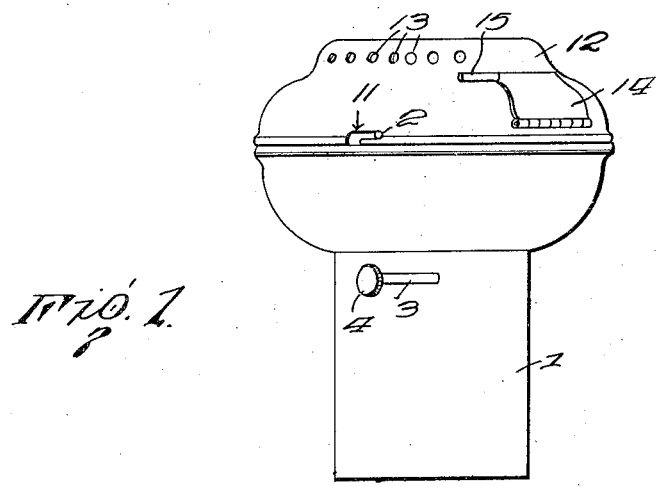
Figure 1 is a side elevation of the improved heater.
Figure 2:
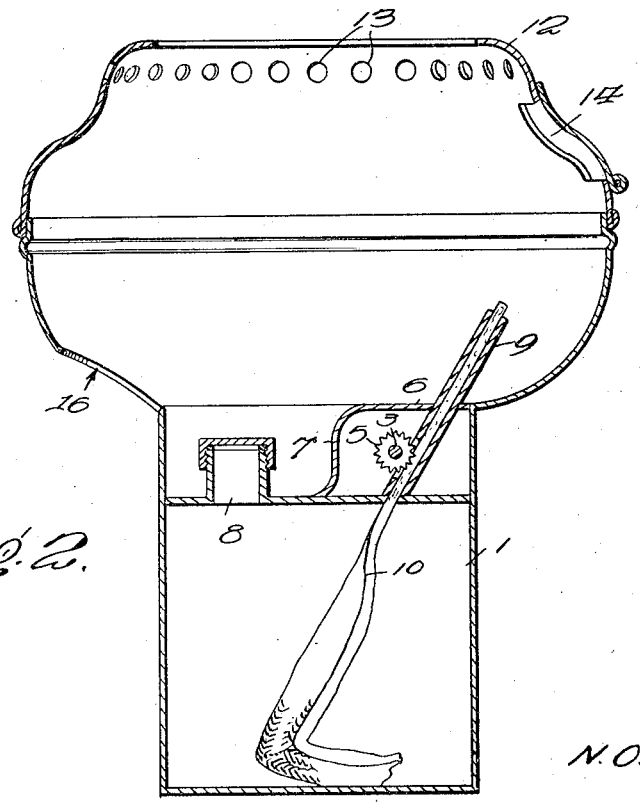
Fig. 2 is a vertical section therethrough.

Having more particular reference to the drawings and in connection with which like reference characters will designate corresponding parts in the several views, 1 represents the fuel containing reservoir of the heating device, the same being preferably cylindrical in shape and having an annular collar 1' arranged about and extending above the upper extremity of the same, which collar is provided with diametrically arranged pins 2, the purpose of which will be hereinafter described.

Journaled in bearings formed in the sides of the reservoir 1 is a shaft 3 carrying a finger piece 4 upon one end thereof and having a wick engaging element 5 mounted intermediate its ends.

A cover 6 is provided for the open upper end of the reservoir 1 and above this cover there is provided a plate 7 which extends partially across the reservoir and has one end portion 7' carried downwardly to the cover 6 thereby providing a housing in which the wick operating means will be properly housed. A filling opening is formed in the cover and is surrounded by a tube 8 over which a suitable form of closure cap may be arranged. Openings are formed in the cover 6 and plate 7 and a wick guiding tube 9 extends from the opening in the cover 6 through the opening in the plate 7 thereby providing a conduit through which the wick 10 passes. It should be noted that this tube is arranged at an oblique angle and extends upwardly into the collar arranged upon the upper end of the reservoir 1. In this way, the wick 10 passing therethrough will be caused to indirectly transmit its heat onto the object arranged on the device.

An annular shield 12 is provided and has bayonet slots 11 formed in the lower portion of the same for receiving the diametrically positioned pins 2 carried by the collar extending from the reservoir 1. Formed concentrically of the upper portion of the shield is an opening 12' in which the glass or other receptacle containing the water to be heated is arranged. Other openings 13 are formed about the shield and obviously, permit the passage of the necessary air from within the heating chamber formed by the same and the collar. To permit the wick to be readily ignited and to allow the quick escape of excessive heat, an opening is formed in the shield 12 and is normally closed by a cover 14 hingedly connected to the said shield and provided with a laterally extending finger piece 15 for an obvious purpose.

A suitable opening 16 may be and preferably is formed in the lower portion of the collar extending from the reservoir 1 and affords air intaking means for the lighted wick.

From the foregoing, it will be readily understood by those skilled in the art that I have provided an exceedingly simple water heating device and further, a device which, due to the provision of the plate 7, will prevent the leaking of the fuel employed over the top of the same, thereby rendering the same safe and eliminating objectionable odors which might arise should kerosene or like fuel be employed. Access may be readily had to the wick and the filling tube by removing the shield 12 as it is desired. Further, attention is also directed to the fact that the heating flame given off by the wick will be prevented from directly contacting with the glass or other receptacle containing the water to be heated which is arranged on the device, thus eliminating the discoloring or breaking of the same.

Manifestly, the construction shown is capable of considerable modification and such modification as is within the scope of my claims, I consider within the spirit of my invention.

I claim:—

1. A heater including a fuel reservoir, a collar arranged about the upper portion of said reservoir, a cover having a wick receiving and a filling opening formed therein, said wick receiving opening being arranged in proximity to one side of said collar, and a shield detachably engaged with said collar.

2. A heater including a fuel reservoir, an annular collar extending upwardy from the reservoir, a cover for the reservoir having a filling and a wick receiving opening formed therein, the wick receiving opening being disposed to cause the arranging of a wick adjacent one side of the collar, and a shield having an open upper end detachably engaged with said collar.

3. A heater including a fuel reservoir, a collar extending upwardly from the reservoir, a cover for the reservoir having a filling and a wick receiving opening therein, the wick receiving opening being disposed to cause the arrangement of a wick adjacent one side of said collar, a shield having an open upper end detachably engaged with said collar, and means formed in the shield for facilitating ignition of said wick.

4. A heater including a fuel reservoir, a collar arranged about the upper portion of said reservoir, a cover for the reservoir having a filling and a wick receiving opening therein, said wick receiving opening being obliquely disposed, an oblique wick guiding tube arranged adjacent the wick receiving opening extending upwardly into the collar to a point in proximity to one side thereof to effect the indirect transmission of heat to an article arranged on the heater, and a shield having the upper portion thereof constricted and formed with a central opening detachably engaged with said collar for receiving and supporting an article to be heated.

In testimony whereof, I affix my signature hereto.

NATHAN OREN LYNN.